United States Patent Office 3,567,479
Patented Mar. 2, 1971

3,567,479
PRODUCTION OF AQUEOUS SUSPENSIONS OF TITANIUM DIOXIDE
Pierre J. Portes, Jacques Andre Krisner, and Robert Jean Mas, Thann, France, assignors to Fabriques de Produits Chimiques de Thann et de Mulhouse, Thann, France
No Drawing. Filed Feb. 9, 1968, Ser. No. 704,274
Claims priority, application France, Feb. 17, 1967, 95,435
Int. Cl. C09c 1/36, 3/02
U.S. Cl. 106—300           3 Claims

ABSTRACT OF THE DISCLOSURE

Aqueous suspensions of titanium dioxide are obtained using as dispersing agent a mixture of an alkali metal salt, especially a phosphate or polyphosphate, and an amine, especially an ethanolamine. The respective amounts of the two components may be 0.5–3%, and 0.05–2%, on the weight of the titanium dioxide. The dispersion can be hydroclassified without use of a flocculating agent.

---

This invention relates to an improved process for bringing into aqueous suspension and hydroclassifying titanium dioxide pigments with a view to subsequent coating operations known as surface treatment.

The manufacture of improved pigmentary titanium dioxide requires the pigment particles to be coated by mineral and/or organic compounds which are attached completely or in part to these particles. (All the operations of selection, preparation and coating of the pigmentary particles are included under the name "surface treatment.") The products thus obtained have a better resistance to chalking in paint, a better dispersibility in the binders into which they are incorporated, a higher gloss, and improved opacifying and covering properties.

It is of prime importance in a surface treatment to eliminate or exclude particles and agglomerates of grain size above about two microns, because their presence is prejudicial to most of the pigmentary properties required of a quality product.

In the manufacturing process known as the "sulphate" process such particles or agglomerates may be formed at the stage of the high-temperature calcination (750° to 1100° C.) of the titanium dioxide gel obtained by hydrolysis of a titanium sulphate solution. As the calcination is performed in a rotary furnace with residence times of several hours at high temperature, there is a danger of the pigment particles becoming agglomerated in a more or less sintered mass. Subsequent grinding destroys some of these agglomerates, without, however, producing an entirely satisfactory product.

The processes for the production of titanium dioxide by oxidation of titanium tetrahalides in the vapour phase can likewise produce particles of superpigmentary size, either in the oxidation process itself and/or in subsequent degasification or calcination.

The pigments obtained by one or other of these processes are generally ground and can be roughly graded by means of air during this grinding operation. They are then brought into aqueous suspension in the presence of dispersing agents with a view to the subsequent coating with the appropriate mineral and/or organic compound or compounds.

The dispersing agents added to the aqueous titanium dioxide suspension are generally salts of alkali metals, such as sodium silicate, metaphosphates and/or polyphosphates of alkali metals (for example sodium hexametaphosphate), and hydroxides; as dispersing agents there are also used certain organic compounds such as organic amines of the alkanolamine type, particularly an ethanolamine, a propanolamine and especially a monoisopropanolamine. The weight of the dispersing agent is generally between 0.05% and 2.5% of the dry weight of the titanium dioxide.

The product in suspension is then generally hydroclassified in a centrifuge to eliminate the coarser particles.

A very considerable difficulty is then sometimes encountered, namely that the suspension produces a very hard centrifugation cake deposited at the periphery of the bowl of the centrifuge, and this produces a very high torque between the bowl and the extraction screw, which often results in elements in the centrifuge breaking and production being stopped.

In order to overcome this disadvantage, it has been proposed to add to the suspension, before centrifuging it, an acid mineral agent such as aluminium sulphate, zirconium sulphate and/or sulphuric acid, which reduces the hardness of the centrifuged cake, and so reduces the degree of torque and thus avoids breakage of machine elements.

However, these acid agents cause a partial reflocculation of the suspension, and so destroy the dispersed state obtained by the aforesaid agents; they may even lead to the mineral or organic coating being produced on flocculates and not on the elementary particles, and this is harmful to the final quality of the surface treated pigment. Consequently, the invention has for an object to provide a process for the preparation of a pigmentary titanium dioxide suspension, which ensures on the one hand a dispersion of the oxide grains which is satisfactory for the surface treatment, and on the other hand permits the dispersion obtained to be hydroclassified, if necessary, without adding a flocculating agent, while assuring regular running of the hydroclassification centrifuge.

In one aspect the invention consists in an improved process for obtaining aqueous suspensions of titanium dioxide by dispersion, optionally followed by hydroclassification, in which the titanium dioxide particles are brought into aqueous suspension in the presence of a mixed dispersing agent containing at least one alkali metal salt and at least one organic amine to make it possible for the suspension to be hydroclassified without subsequent addition of flocculating agents.

The invention consists also in the pigments obtained by this process.

Various laboratory tests have enabled the degree of dispersion of the titanium dioxide in the suspension to be measured, and also the hardness of the decanted substance obtained after centrifuging. The test referred to as Test 1 measures the percentage of pigment remaining in the suspension and thus truly dispersed, after centrifuging in the laboratory by means of a bowl-type centrifuging machine. The test referred to as Test 2 measures by means of a penetrometer, the hardness of the centrifuge cakes obtained under these conditions, the higher the figures the greater the hardness. If the figure expressing this hardness is high, it can be expected that the intensity of the torque developed between the bowl and the extraction screw of the hydroclassification apparatus will be very high and may cause stoppage of the apparatus.

The tests were carried out with conventional dispersing agents, namely sodium silicate, sodium hexametaphosphate, sodium hydroxide and triethanolamine, as well as with a dispersing mixture according to the invention, namely a mixture of sodium hexametaphosphate and triethanolamine, on samples prepared under the same conditions with identical titanium dioxides at the uniform concentration of 300 g./l. The centrifuging tests were carried out after a constant time of contact between pigment and dispersing solution. Some results obtained for the two measurements are set out in the following table:

| Nature of dispersing agent | Test 1;[1] Test 2[2] | Percent of dispersing agent used/weight of pigment | | | | | | | | | | |
|---|---|---|---|---|---|---|---|---|---|---|---|---|
| | | 0 | 0.1 | 0.2 | 0.3 | 0.4 | 0.5 | 0.6 | 0.7 | 0.8 | 0.9 | 1 |
| Sodium silicate | Test 1 | 0.3 | 0.4 | 0.4 | 22 | 20 | 14 | 12 | 11 | | | 10 |
| | Test 2 | 440 | 360 | 280 | 290 | | 520 | | 700 | | | 680 |
| Sodium hexametalphosphate | Test 1 | 0.3 | 0.3 | 0.4 | 18 | 28 | 33 | | 37 | | | 39 |
| | Test 2 | 440 | 400 | 340 | 180 | 170 | 60 | | 60 | 60 | | 60 |
| Sodium hydroxide | Test 1 | 0.3 | 0.3 | 18 | 17 | 1.5 | | 1.5 | | 1.5 | | 2 |
| | Test 2 | 440 | 230 | 100 | 130 | | 170 | | 200 | | 215 | 220 |
| Triethanolamine | Test 1 | 0.3 | 0.3 | 0.3 | 0.3 | | 2 | | 2 | | 3 | 7 |
| | Test 2 | 440 | 250 | 250 | 230 | | 210 | | 210 | | 150 | 130 |
| Mixture of 0.4% of sodium hexametaphosphate with variable quantities of triethanolamine 0 to 1% | Test 1 | 27 | 34 | 34 | | 35 | | 35 | | 35 | | 34 |
| | Test 2 | 170 | 50 | 40 | <29 | <29 | <29 | <29 | <29 | <29 | <29 | <29 |

[1] Percent of pigment remaining dispersed.
[2] Hardness of the cake.

The low values for the hardness of the cakes obtained with the mixture according to the invention, and the constancy of the degree of dispersion for the different amounts of the amine used, will be noted. Attempts were made to hydroclassify industrially the dispersions obtained with the percentages of dispersing agent giving the highest degree of dispersion according to Test 1. For the first four suspensions (outside the scope of the invention), a suitable hydroclassification was only possible after some reflocculation of the suspension by addition of aluminum sulphate, which harmed the quality of the chemical coating subsequently formed on the grains.

On the other hand, the pigment suspensions prepared according to the invention could be suitably hydroclassified without any additive and without clogging the centrifuge. Thus, a suspension was obtained which maintains a high degree of dispersion before being centrifuged and which was already suitable for hydroclassification.

It is possible to obtain higher rates of dispersion by means of the conventional dispersing agents by increasing the agitation energy while the pigment is in the aqueous suspension, but it is found that this increase in the amount of dispersed pigment (Test 1) corresponds to an increase in the hardness of the centrifugation cake obtained, as shown in the following table.

This table gives the results of different tests carried out on suspensions of titanium dioxide in water at a concentration of 300 g./litre in the presence of sodium silicate in amounts between 0.1 and 1% (calculated as $SiO_2$ on the dry weight of the dry titanium dioxide) and prepared in identical tanks equipped with identical agitators but turning at different speeds, the agitation times being the same for all the tests.

perfectly dispersed suspension by means of the conventional adjuvants leads to centrifugation residues which are very hard and which generally do not permit an industrial centrifuge to operate satisfactorily.

When the suspension was made with the aid of a mixture of dispersing agent according to the invention, it was found that the hardness of the centrifuged cake was practically independent of the agitation or stirring conditions.

Depending on the nature of the titanium dioxide to be dispersed, experience showed that the most suitable quantities of sodium hexametaphosphate and triethanolamine, are between 0.05 and 3% and between 0.05 and 2% respectively, based on the weight of the pigment. Particularly good results are obtained using between 0.3 and 1% of sodium hexametaphosphate and between 0.1 and 0.5% of triethanolamine.

It has also been confirmed that the waiting time between the formation of a suspension and its hydroclassification, when using the conventional dispersing agents, can affect the quality of the dispersion measured in Test 1 and the hardness of the centrifuged residue measured in Test 2. These effects are particularly prejudicial to the hydroclassification; an interval of more than 4 hours lowers the quality of the dispersion and also tends to increase the hardness of the residue. They are not observed when a hexametaphosphate and organic amine mixture is used, the dispersion then retaining its quality and the residue always having a very small hardness value.

It has also been found that certain ions, particularly $Zn++$, can substantially modify the behaviour of the aqueous suspension of titanium dioxide and the hydroclassification conditions of the suspensions. Thus the presence of these ions is prejudicial to the production of highly dispersed suspensions, and also appreciably in-

| | Peripheral linear speed of stirrer, m./min. | Percent $SiO_2$ added to the suspension in the form of sodium silicate | | | | | | | | | | |
|---|---|---|---|---|---|---|---|---|---|---|---|---|
| | | 0 | 0.1 | 0.2 | 0.3 | 0.4 | 0.5 | 0.6 | 0.7 | 0.8 | 0.9 | 1 |
| Test 1 (percent of dispersed $TiO_2$) | 186 | 0.3 | 0.3 | 0.4 | 22 | | 14 | | 11 | | | 10 |
| | 119 | 0.3 | 0.3 | 0.3 | 11 | | 8 | | 6 | | | 4 |
| | 43 | 0.3 | 0.3 | 0.3 | 7 | | 4 | | 3 | | | 1.5 |
| Test 2 (hardness of cake) | 186 | 440 | 360 | 280 | 290 | | 520 | | 700 | | 710 | 680 |
| | 119 | 540 | 340 | 200 | 240 | | 480 | | 610 | | 500 | 550 |
| | 43 | 460 | 300 | 190 | 230 | | 300 | | 520 | | | |

It is seen from this table that the best results with Test 1 were obtained with high agitation or stirring speeds (186 m./min. linear speed of the operating edges of the blades of the stirrer) but that these results correspond to high hardness values, measured by Test 2.

Under these conditions, it appears that to obtain the best possible dispersed suspension using the conventional dispersing agents by using powerful agitation means is not technically desirable, and the suspension obtained cannot be suitably hydroclassified, because of the hardness of the centrifugation residue which it provides.

These results are found with all the conventional dispersing agents mentioned above. The production of a creases the hardness of the centrifugation residues, when conventional dispersing agents are used. Tests showing this are described in Example 3.

It is also known that, to obtain a high quality dispersion, it is normally preferable to free the pigment from the soluble salts which it contains, especially in the case of titanium dioxide prepared by the sulphate process. The elimination of the soluble salts can be effected by washing, followed by a filtration, or by any other appropriate means. It is found that the centrifugation residues given by suspensions prepared with the aid of washed titanium dioxides have hardness values which are decidedly lower than those given by suspensions of the same oxides, prepared under the same conditions but unwashed. These findings are illustrated in Example 4. Neither of these effects is very significant when the dispersing agents of the invention are used.

The following examples illustrate the invention.

EXAMPLE 1

A titanium dioxide pigment containing 0.8% of ZnO, crushed while dry by means of a swinging-type grinder, is dispersed in water to give a concentration of 300 g./l. of $TiO_2$. This suspension is divided into two equal parts. Increasing quantities of sodium silicate are added to samples of the first fraction so as to obtain concentrations of $SiO_2$, varying from 0.1 to 1% or the dry weight of the pigment. In the same manner, the samples of the second fraction have added thereto 0.4% of hexametaphosphate and quantities of triethanolamine rising from 0 to 1%. The stirring time and speed were in all cases 10 minutes for one litre of suspension with a peripheral linear speed of the turbine of 186 metres/minute. The results are summarised in the following table.

|  |  |  | Percent $SiO_2$ in the form of $Na_2SiO_3$/weight of pigment | | | | | | | | | | |
|---|---|---|---|---|---|---|---|---|---|---|---|---|---|
| Nature of the dispersing agent or agents | Test 1;[1] | Test 2[2] | 0 | 0.1 | 0.2 | 0.3 | 0.4 | 0.5 | 0.6 | 0.7 | 0.8 | 0.9 | 1 |
| Sodium silicate | Test 1 | | 0.3 | 0.3 | 0.4 | 21 | 19 | 15 | | 11 | | | 10 |
| | Test 2 | | 440 | 440 | 340 | 180 | | 70 | | 65 | | | 50 |
|  |  |  | Percent TEA added | | | | | | | | | | |
|  |  |  | 0 | 0.1 | 0.2 | 0.3 | 0.4 | 0.5 | 0.6 | 0.7 | 0.8 | 0.9 | 1 |
| 0.4% hexametaphosphate plus TEA | Test 1 | | 27 | 33 | 34 | 34 | | 35 | | 34 | | | 34 |
| | Test 2 | | 180 | 60 | 40 | 35 | <29 | <29 | <29 | <29 | | | <29 |

[1] Percent of pigment remaining dispersed.
[2] Hardness of cake.

As can be seen from the table, the rate of dispersion obtained by the use of the mixture of sodium hexametaphosphate and triethanolamine is always better than that obtained using either sodium silicate or sodium hexametaphosphate separately.

The hardness of the cakes deposited by centrifuging is always more favourable with the dispersing mixture of the invention.

EXAMPLE 2

An aqueous suspension of 320 g./l. of titanium dioxide, obtained by the sulphuric acid method and containing 0.27% of $Al_2O_3$, was prepared. To this suspension was added 0.4% of sodium hexametaphosphate, 0.15% of monoethanolamine and 0.15% of triethanolamine. After stirring in a tank by means of a turbine, samples were taken and subjected to Tests 1 and 2.

Test 1 indicated that 41% of titanium dioxide remained dispersed.

Test 2 indicated a hardness of 35.

This suspension was then hydroclassified through a Bird centrifuge fed at a rate of 7 cubic metres per hour. The percentage of residue separated by the centrifuge was 20 to 25%. The recorded torque remained constant and relatively low throughout the entire hydroclassification.

The dispersed pigment was then surface-treated in the conventional manner by means of aluminum sulphate. After neutralisation, washing, drying and micronisation, the pigment was subjected to various pigmentary checks. These showed that its properties as regards dispersibility resistance to chalking, gloss and tinting strength were better than those of a product which had been dispersed with sodium silicate and surface-treated under the same conditions.

EXAMPLE 3

Two series of aqueous suspensions of 300 g./l. of pigment were prepared, the first from a pigment B containing 0.6% of ZnO, and the second from a pigment A free from ZnO. Each suspension was divided into several parts, to which were added either variable quantities of silicate or variable quantities of triethanolamine, and a certain quantity of sodium hexametaphosphate. The results are summarised in the following table.

|  |  | Percent of added $SiO_2$/weight of pigment | | | | | | | | | | |
|---|---|---|---|---|---|---|---|---|---|---|---|---|
|  |  | 0 | 0.1 | 0.2 | 0.3 | 0.4 | 0.5 | 0.6 | 0.7 | 0.8 | 0.9 | 1 |
| Pigment A without ZnO | Percent $TiO_2$, Test 1 | 26 | 39 | 32 | 30 | | 27 | | 22 | | | 15 |
| | Hardness, Test 2 | 150 | 80 | 60 | 60 | | 60 | | | | | 60 |
| Pigment B with 0.6% ZnO | Percent $TiO_2$, Test 1 | 0.3 | 0.3 | 0.4 | 21 | 19 | 15 | | 11 | | | 10 |
| | Hardness, Test 2 | 440 | 440 | 340 | 180 | | 70 | | | | | 60 |
|  |  | Percent of added triethanolamine/weight of pigment | | | | | | | | | | |
|  |  | 0 | 0.1 | 0.2 | 0.3 | 0.4 | 0.5 | 0.6 | 0.7 | 0.8 | 0.9 | 1 |
| Pigment A without ZnO $(NaPO_3)_6$ 0.1% | Percent $TiO_2$, Test 1 | 39 | 41 | 41 | 41 | | 40 | 40 | 40 | | | 40 |
| | Hardness, Test 2 | 90 | 50 | 40 | 35 | 29 | <29 | <29 | <29 | <29 | <29 | <29 |
| Pigment B with ZnO $(NaPO_3)_6$ 0.4% | Percent $TiO_2$, Test 1 | 27 | 38 | 34 | 34 | | 35 | | 34 | | | 34 |
| | Hardness, Test 2 | 180 | 60 | 40 | 35 | <29 | <29 | <29 | <29 | <29 | <29 | <29 |

When sodium silicate was used, it was found that pigment A was dispersed more easily than pigment B. Also the hardness values of the centrifugation residues were clearly lower in the case of pigment A than in the case of pigment B for $SiO_2$ contents below 0.5%. In the suspensions treated with the mixture of the invention, the presence of $Zn++$ ions had no substantially harmful effect on the quality of the dispersion or on the hardness of the centrifugation cake.

EXAMPLE 4

A quantity of a titanium dioxide pigment referred to as pigment A was partially freed from the soluble salts which it contained by washing with water. The resulting pigment is called pigment B.

Each of these pigments was brought into aqueous suspension in the presence of:

(a) sodium silicate (0.3% $SiO_2$ on the weight of pigment),
(b) sodium hexametaphosphate (0.5%), or
(c) a mixture of dispersing agents of the invention (0.4% of sodium hexametaphosphate and 0.2% of triethanolamine).

The results obtained are summarised in the following table.

| Adjuvant | Pigment | Treatment undergone by the pigment before dispersion | Percent TiO$_2$, Test 1 | Hardness, Test 2 |
|---|---|---|---|---|
| SiO$_2$ 0.3% | A | Nil | 21 | 300 |
| | B | 1 Washing | 33 | 100 |
| Sodium hexametaphosphate 0.5% | A | Nil | 33 | 70 |
| | B | 1 washing | 34.4 | 54 |
| Mixture of sodium hexametaphosphate 0.4% and TEA 0.2% | A | Nil | 33 | <29 |
| | B | 1 washing | 36.5 | <29 |

The table shows that the combination of hexametaphosphate and organic amine makes it possible to obtain a satisfactory dispersion and a very low hardness value of the centrifugation residue obtained from suspensions of calcined titanium dioxide which have not been washed to remove soluble salts.

The various examples show the value of the invention. For a cake hardness which is practically constant and of relatively low value, compatible in every case with good operation of the centrifuge and for the hydroclassification, high dispersion rates are obtained. The mixture of dispersing agents which is used permits the presence of ions such as Zn++ without an apprecible decrease in the qualities of the suspension and without substantially increasing the hardness of the centrifugation cake.

We claim:

1. In a process for the production of an aqueous suspension of titanium dioxide pigment which includes the steps of bringing particles of titanium dioxide into suspension with the aid of a dispersing agent and then hydroclassifying the titanium dioxide by centrifuging the said suspension, the improvement which consists in employing as the dispersing agent 0.05–3% of sodium hexametaphosphate and also 0.05–2% of triethanolamine, both on the weight of the titanium dioxide.

2. A process according to claim 1, in which there is employed 0.3–1% of the sodium hexametaphosphate and 0.1–0.5% of the triethanolamine, both on the weight of the titanium dioxide.

3. Process according to claim 1, in which the suspension is hydroclassified in the absence of a flocculating agent.

References Cited

UNITED STATES PATENTS

| 2,296,066 | 9/1942 | Sloan | 106—308N |
| 2,737,460 | 3/1956 | Werner | 106—300 |
| 2,933,408 | 4/1960 | Dempster | 106—300 |
| 3,337,300 | 8/1967 | Hughes | 106—308IX |
| 3,345,187 | 10/1967 | Binnis | 106—308NX |
| 3,172,772 | 3/1965 | Rowe | 106—300 |

TOBIAS E. LEVOW, Primary Examiner

H. M. S. SNEED, Assistant Examiner

U.S. Cl. X.R.

106—308B, 308N; 209—5